C. P. HALL.

PIPE JOINT.

APPLICATION FILED JULY 23, 1913.

Reissued Feb. 29, 1916.

14,077.

WITNESSES:
R. L. Bruck,
Hugh B. McGill.

INVENTOR:
Chester P. Hall
BY Hull & Smith ATTY'S.

UNITED STATES PATENT OFFICE.

CHESTER P. HALL, OF LOMBARD, ILLINOIS, ASSIGNOR, BY MESNE ASSIGNMENTS, TO J. W. McFERRAN, OF CANTON, OHIO.

PIPE-JOINT.

14,077. Specification of Reissued Letters Patent. Reissued Feb. 29, 1916.

Original No. 1,030,237, dated June 18, 1912, Serial No. 540,798. Application for reissue filed July 23, 1913. Serial No. 780,793.

*To all whom it may concern:*

Be it known that I, CHESTER P. HALL, a citizen of the United States, residing at Lombard, in the county of Dupage and State of Illinois, have invented certain new and useful Improvements in Pipe-Joints, of which the following is a specification.

My invention relates to improvements in pipe joints and primarily to devices of the character described for joining adjacent ends of electrical-conduit tubing or pipe, although it may be employed in connection with any form of conduit.

One of the objects of my invention is to provide a joint that will firmly and strongly hold the adjacent ends of the conduit pipe without the necessity of decreasing the internal diameter thereof.

Other objects of my invention are, the provision of a joint that may be readily and quickly applied without removing the protecting enamel from the surface of the pipe where the pipe will be exposed to the oxidizing influence of the atmosphere; and the provision of a joint that may, when necessary, be used on pipe having threads or grooves cut in the exterior surface of the ends, and which will cover and protect the threads thereof from the destructive effects of the atmosphere; the provision of a ring or sleeve which may be manufactured with a minimum of expense and applied with a minimum of attention, and which, when applied, shall develop a biting rib or engaging portion which shall render the joint extremely tight and secure; while further objects and advantages will become apparent as the description proceeds.

Figure 1:
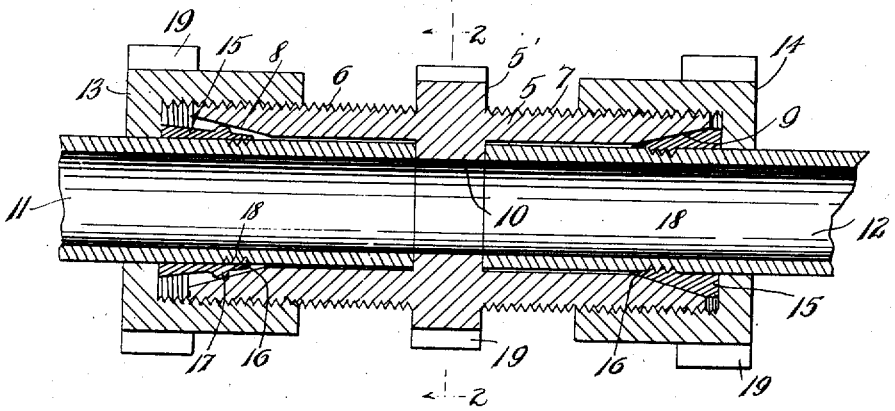
Figure 2:
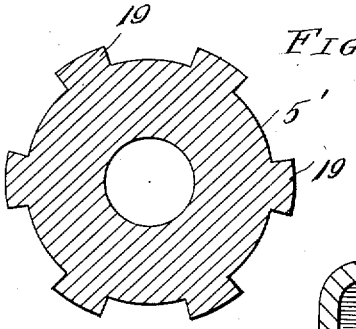
Figure 3:
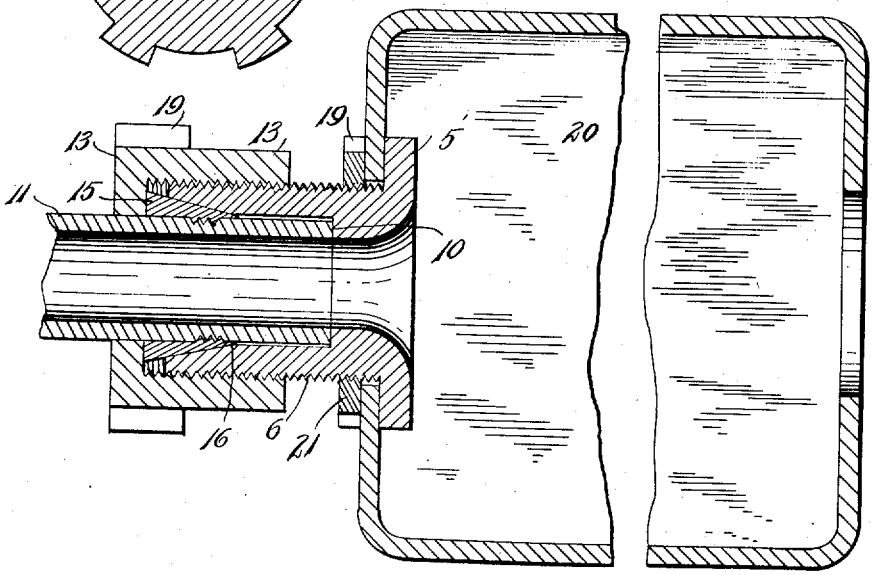

Generally speaking my invention may be defined as consisting of the constructions and combinations recited in the claims hereto annexed and illustrated in one embodiment, in the drawings accompanying and forming a part of this application, wherein: Figure 1 is a longitudinal section showing the joint applied to the ends of two adjacent pipes, showing one joint completed and the other ready to be tightened up; Fig. 2 is a cross sectional view taken on line 2—2 of Fig. 1; and Fig. 3 is a longitudinal section showing one side of the double joint, or single joint, used to connect a conduit pipe to a junction or outlet box.

In all of the views, the same reference characters indicate similar parts.

A fitting 5, as shown in Fig. 1, is exteriorly screw-threaded at both ends, as at 6 and 7. It is slightly tapered inwardly at both ends, as at 8 and 9, and may, if desired, be provided with an interior shoulder 10, forming an abutment against which the ends of the respective pipes are presented. The ends of the fitting are provided with the interiorly threaded caps 13, 14, each of which is formed with a central bore of a size to receive snugly the pipe to be used therewith.

Upon the end of each pipe is positioned a ring or sleeve 15, preferably made of a relatively soft malleable metal, such as yellow brass, white metal, or the like, and having a substantially smooth cylindrical bore of a diameter to receive snugly the pipe. The forward end of each ring preferably presents a comparatively thin edge 16 formed by the substantial convergence of the tapered exterior and the cylindrical bore. Prior to assemblage each ring is formed upon its tapered exterior portion and at a short distance from its edge 16 with an annular rib 17, whose external diameter is intermediate the larger and smaller diameters of the tapered portions 8, 9.

In case the pipes to be joined are of hard metal the same are preferably scarfed with a plurality of grooves cut into the pipe, as at 18. This can be conveniently and quickly done by means of one turn of a pipe cutter. The threaded caps, 13 and 14, and tapered rings 15 are first placed on the respective ends of the pipe or conduit, the ends of the pipe are then scarfed by means of a suitable cutter, as shown, and said ends are then introduced in the respective tapered ends of the sleeve and the caps are screwed on to the respective ends of the sleeve. In the case of pipes of softer metal this advance scarfing can, of course, be omitted, the rings being merely located upon the pipe ends and forced into place. The tightening of the caps on the ends of the fitting causes a powerful inward pressure to be exerted upon the ribs 17, causing them to be reduced and pressed down toward the conical surface of the ring or sleeve. At the same time, the interior of the sleeve will be bulged inwardly, so as to fill the scarfs 18 as shown at the right hand side of Fig. 1, or so as to bite into the surface of the pipe in case the same be of soft metal. In any case the rib which was originally upon the exterior of the ring or sleeve is transferred by the pressure to the interior of the same and become interlocked with the pipe, rendering the joint impervious to fluids and safe from accidental separation.

For the purpose of conveniently rotating the sleeve and caps, I provide wings, as shown at 19, on the peripheral surface and use an ordinary spanner wrench for engagement therewith. Of course, these surfaces can be made smooth and a pipe wrench employed to turn the said caps or they may be provided with plural flat parallel surfaces and turned with a monkey wrench or the like.

20 represents an ordinary junction or outlet box, usually used in interior conduit systems, showing the manner of attaching my fitting thereto. In this case, only one half of the fitting shown in Fig. 1, or a single joint fitting is used, and a check nut, 21, is employed for holding it in intimate contact with the box.

The act of forcing the tapered ring, 15, between the pipe and the fitting tends to contract the ring and to expand the fitting, thereby making water-tight joints between these parts, forcing parts of the rings into the scarfs cut on the pipe, and effecting a more intimate contact between the cap and the end of the fitting, thereby to more firmly hold the cap in place.

The circumferential enlargement near the smallest tapered end of the ring or sleeve is an essential part of the invention, as by this means, portions of the rings are forced into intimate contact with the exterior of the pipe. As already explained the same action takes place whether the scarfs are annular and endless as when made by a cutting tool, or helical as when made by a thread-cutting die, or even when the exterior of the pipe is smooth, provided the proper relative hardness of pipe and sleeve be chosen. It will be understood, however, that the particular shape and construction of the fitting and the particular arrangement of parts whereby inward pressure is brought to bear upon the rib may be varied widely without departing from the scope of my invention. Accordingly, while I have described my invention in detail I do not propose to limit myself to such details except as the same may be positively recited in the claims hereto annexed or may be rendered necessary by the prior state of the art.

Having thus described an embodiment of my invention, what I claim is:

1. In a pipe joint, the combination, with a pipe having a normally non-threaded end, of a fitting to receive the pipe end, said fitting exteriorly threaded and interiorly tapered near its end, a ring of soft malleable metal adapted to surround the pipe and tapered for coaction with the tapered portion of said fitting upon the application of pressure thereto to hold the pipe, and a cap threaded for engagement with said fitting and for forcing said tapered ring into contact therewith, said pipe having cut therein at approximately the inner edge of the taper of said fitting a sharp edged groove for reception of a sharp thread of said ring to be forced thereinto upon operation of said threaded cap.

2. In a pipe joint, the combination with a pipe, having a normally non-threaded end, of a fitting to receive the pipe end, said fitting exteriorly threaded and interiorly tapered near its end, an interior shoulder against which the pipe end abuts, a ring of soft malleable metal surrounding the pipe and tapered by the application of pressure thereto to wedge between said tapered portion of the fitting and pipe, and a cap threaded for engagement with said fitting and forcing said tapered ring into contact therewith, said pipe having cut therein a groove adjacent the small edge of said tapered ring for reception of the extreme edge of said tapered malleable ring forced thereinto upon operation of said cap.

3. In a pipe joint, the combination of a pipe end having made therein (as by a single turn of a pipe cutter) a sharp edged groove at a suitable distance from the end thereof, a fitting adapted to receive said pipe end providing a shoulder to receive in contact therewith the end of said pipe, the interior surface of said fitting providing a flaring portion extending outwardly from said groove in the pipe end and the exterior surface of said sleeve being screw-threaded, an interiorly screw-threaded cap for engagement with said screw threads of the sleeve, and a wedge ring of soft malleable metal tapering to provide on one side a pointed annular edge, said wedge ring lying with its pointed edge within the tapering space between the sleeve and pipe end, said ring being by turning of the cap, forcibly wedged into said space, and the pointed edge lying in the groove of said pipe end as, and for the purpose described.

4. In a pipe joint, the combination with a pipe end having a groove therein and a non-threaded portion adjacent said groove, of a fitting providing an interior surface for coaction along the outer surface of the pipe, and a surface flaring outwardly to overlie said non-threaded portion, whereby there is included between said flaring surface of the fitting and said non-threaded portion of the pipe an inwardly tapering space said space ending substantially at the groove in said pipe, a ring of malleable metal, and a cap adapted to be moved toward said ring to press the latter into said tapering space and groove, as described.

5. In a pipe joint, the combination, with a pipe end having a groove therein and a non-threaded portion adjacent said groove, of a fitting providing an interior surface for coaction along the outer surface of the pipe end, and a surface flaring outwardly to overlie said non-threaded portion, whereby there is included between said flaring surface of the fitting and non-threaded portion of the pipe an inwardly tapering space said space ending substantially at the groove in said pipe, a ring of malleable metal tapering toward one side to provide a pointed annular edge and having adjacent its edge an enlargement, and a cap adapted to be moved toward said ring to press the latter into said tapering space between the fitting and pipe and to press said enlargement down into said groove.

6. In a pipe joint, the combination, with a pipe end having a groove therein, of a fitting providing an interior surface for coaction along the outer surface of the pipe and a surface flaring outwardly to provide between said flaring surface and the pipe a tapering space said space ending substantially at said groove, a tapering ring having an enlargement at its smaller end, and a cap adapted to be moved against said ring to press it into said tapering space between the fitting and pipe and to press said enlargement down into said groove, as described.

7. In a coupling for cylindrical metal members, the combination, with a hard metal fitting having at its end a flaring recess adapted to receive one of said coupled members, of a ring or sleeve of strong ductile material adapted to fit closely about said coupled member and having its exterior tapered in the same direction as said recess, an integral rib surrounding said ring or sleeve adjacent to its forward end, said rib having a diameter intermediate the largest and smallest diameters of said recess, and means whereby said ring or sleeve may be forced longitudinally into said recess, whereby said rib will be pressed down toward the exterior surface of said sleeve at the point opposite said rib and the interior surface of said sleeve will be beaded so as to interlock with said coupled member.

8. In a coupling for cylindrical metal members, the combination, with a hard metal fitting having a cylindrical portion adapted to embrace one of the members to be coupled and also having at its end a flaring recess, of a ring or sleeve of material whose resistance to crushing is greater than the resistance of said coupled member to withstand the constriction of said sleeve, said sleeve having a substantially cylindrical bore adapted to receive closely the end of said coupled member and having a tapered exterior, an integral rib surrounding said ring or sleeve adjacent to its forward end, and a cap adapted to be moved toward said ring or sleeve to press the same into said recess, whereby said rib will be pressed down toward the exterior surface of said ring or sleeve and the interior surface of said ring or sleeve at the point opposite said rib will be beaded so as to interlock with said coupled member.

9. In a coupling for metal members, a sleeve adapted to surround and fit closely about such a member and having a tapered exterior surface and a circumferential rib intermediate the ends of said surface, a fitting having a flaring interior adapted to receive said sleeve and rib, the diameter of said rib being intermediate between the greatest and least diameters of the flaring portion of said fitting, and means for forcing said sleeve longitudinally into said fitting whereby said rib will be reduced exteriorly and the interior of said sleeve at a point opposite said rib beaded to interlock with the member therewithin.

10. In a coupling, the combination, with a fitting having a flaring recess, of a sleeve of malleable metal having a cylindrical interior and a tapered exterior, said sleeve having an integral, circumferential, external rib spaced from its narrow end, an apertured member adapted to be secured to said fitting and to have a driving connection with said sleeve whereby the same can be forced into said recess and said rib transferred from the exterior to the interior of said sleeve, the aperture of said member being substantially in alinement with the interior of said sleeve.

11. In a coupling for cylindrical metal members, the combination, with a sleeve having a cylindrical surface adapted to fit closely against the cylindrical surface of such member and having an annular rib projecting from the surface opposite to said cylindrical surface, of means for exerting pressure upon said rib whereby the same may be depressed in the direction of the surface from which it projects and a bead raised on said cylindrical surface opposite thereto which shall interlock with said coupled member.

12. In a coupling for metal members, the combination, with a pair of tubular coupling members and means for adjustably connecting them, one of said coupling members being provided with a flaring entrance end, of a ring or sleeve of hard ductile metal tapered forwardly to a comparatively thin edge and having a circumferential integral rib a short distance in the rear of said edge, the normal exterior diameter of said rib being intermediate the largest and smallest diameters of said entrance end, the other of said coupling members having a driving connection with said sleeve, whereby when the coupling members are drawn close together said rib will be transferred from the exterior to the interior of said sleeve and said sleeve firmly interlocked with said coupled member.

In testimony whereof, I hereunto affix my signature in the presence of two witnesses.

CHESTER P. HALL.

Witnesses:

FORÉE BAIN,

MARY F. ALLEN.